United States Patent
Cal

(10) Patent No.: US 11,673,293 B2
(45) Date of Patent: Jun. 13, 2023

(54) APPARATUS FOR PURIFICATION OF PLASTIC MATERIAL INTENDED FOR FOOD CONTACT

(71) Applicant: Costruzioni Meccaniche Luigi Bandera S.p.A., Busto Arsizio (IT)

(72) Inventor: Roberto Cal, Busto Arsizio (IT)

(73) Assignee: Costruzioni Meccaniche Luigi Bandera S.p.A., Busto Arsizio (IT)

( * ) Notice: Subject to any disclaimer, the term of this patent is extended or adjusted under 35 U.S.C. 154(b) by 584 days.

(21) Appl. No.: 16/622,388

(22) PCT Filed: Jun. 19, 2018

(86) PCT No.: PCT/IB2018/054496
§ 371 (c)(1),
(2) Date: Dec. 13, 2019

(87) PCT Pub. No.: WO2018/234983
PCT Pub. Date: Dec. 27, 2018

(65) Prior Publication Data
US 2020/0101642 A1 Apr. 2, 2020

(30) Foreign Application Priority Data
Jun. 19, 2017 (IT) .................. 102017000067821

(51) Int. Cl.
| | | |
|---|---|---|
| *B29B 17/02* | (2006.01) | |
| *B29B 13/02* | (2006.01) | |
| *B29B 13/06* | (2006.01) | |
| *C08G 63/183* | (2006.01) | |
| *C08G 63/90* | (2006.01) | |
| *B09B 3/40* | (2022.01) | |
| *B01F 23/70* | (2022.01) | |
| *B01F 27/722* | (2022.01) | |
| *B29K 67/00* | (2006.01) | |
| *B29L 31/00* | (2006.01) | |
| *B01F 101/00* | (2022.01) | |

(52) U.S. Cl.
CPC ............ *B29B 17/02* (2013.01); *B01F 23/704* (2022.01); *B01F 23/711* (2022.01); *B01F 27/722* (2022.01); *B09B 3/40* (2022.01); *B29B 13/02* (2013.01); *B29B 13/065* (2013.01); *C08G 63/183* (2013.01); *C08G 63/90* (2013.01); *B01F 2101/2805* (2022.01); *B29B 2017/0286* (2013.01); *B29K 2067/003* (2013.01); *B29L 2031/712* (2013.01)

(58) Field of Classification Search
USPC ........ 422/287; 528/388, 485, 486, 488, 490, 528/492
See application file for complete search history.

(56) References Cited

FOREIGN PATENT DOCUMENTS

| | | |
|---|---|---|
| DE | 43 21 142 A1 | 1/1995 |
| DE | 10 2014 104 955 A1 | 10/2015 |
| EP | 000437267 A1 * | 1/1991 |
| EP | 0 437 267 A1 | 7/1991 |
| EP | 0 466 362 A1 | 1/1992 |
| EP | 1 226 922 A1 | 7/2002 |
| EP | 1 703 239 A2 | 9/2006 |
| JP | S54 103707 | 8/1979 |
| JP | H04 174287 A | 7/1987 |
| JP | S62 151317 A | 7/1987 |
| JP | H03 208608 A | 9/1991 |
| JP | H04 062382 A | 2/1992 |
| JP | H06-094133 B2 | 11/1994 |
| JP | 2004-058271 A | 2/2004 |
| JP | 2013 203816 A | 10/2013 |

OTHER PUBLICATIONS

EP0437267B1 machine translation; Nakagomi, Shoji; Plastic drying apparatus (Year: 1995).*
Japanese Office Action corresponding to 2019-567279 dated Mar. 8, 2022.
Brazilian Office Action corresponding to 1120190271864 dated May 2, 2022.
Chinese Office Action Corresponding to 2018800404641 dated Apr. 8, 2021.
Italian Search Report Corresponding to 201700067821 dated Nov. 13, 2017.
International Search Report Corresponding to PCT/IB2018/054496 dated Sep. 14, 2018.
Written Opinion Corresponding to PCT/IB2018/054496 dated Sep. 14, 2018.
Indian Office Action Corresponding to 202047001380 dated Sep. 20, 2021.
Korean Office Action Corresponding to 10-2020-7001895 dated Oct. 29, 2022.

* cited by examiner

*Primary Examiner* — Terressa Boykin
(74) *Attorney, Agent, or Firm* — Finch & Maloney PLLC

(57) ABSTRACT

A polyethylene terephthalate purification apparatus comprises at least a reactor (4) which houses the plastic material to be purified, an opening connected to a vacuum pump, stirrers (16) to ensure the stirring of the plastic material inside of the reactor (4) and a heating mechanism comprising a microwave heating device to promote the excitation of the polar molecules.

12 Claims, 3 Drawing Sheets

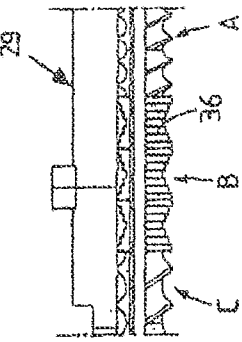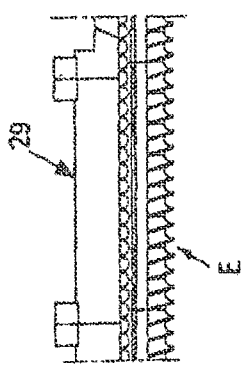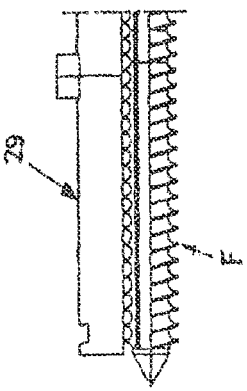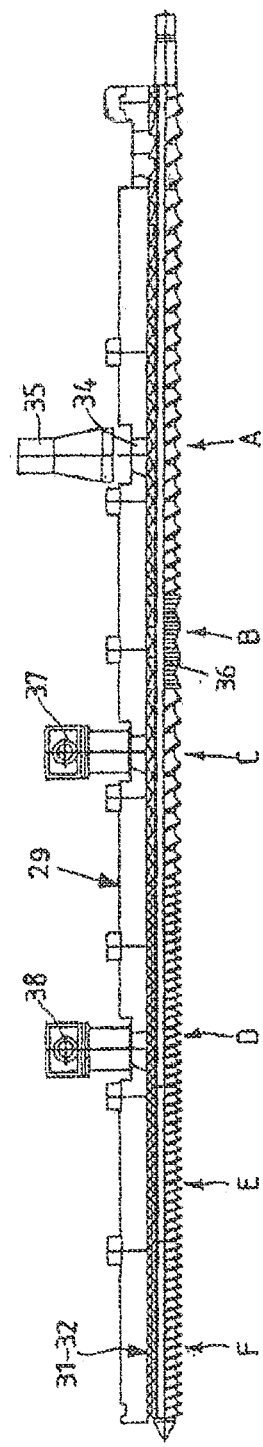

APPARATUS FOR PURIFICATION OF PLASTIC MATERIAL INTENDED FOR FOOD CONTACT

This application is a National Stage completion of PCT/IB2018/054496 filed Jun. 19, 2018, which claims priority from Italian patent application serial no. 102017000067821 filed Jun. 19, 2017.

FIELD OF THE INVENTION

This invention relates to an apparatus for the purification of plastic material, in particular polyethylene terephthalate, intended for contact with food.

According to a further embodiment, this invention also relates to an extrusion system for plastic material, in particular polyethylene terephthalate.

According to a still further embodiment, this invention relates to a process for the purification of plastic material intended for contact with food, in particular polyethylene terephthalate, as well as on an extrusion process of such purified plastic material.

For the sake of simplicity of exposure, this description is made in a non-limiting manner with particular reference to polyethylene terephthalate (also characterized by the PET abbreviation) as a possible example of a plastic material.

BACKGROUND OF THE INVENTION

Nowadays, the use of polyethylene terephthalate is very widespread, for example for manufacturing containers, bottles, trays and the like, also considering the possibility of being able to recycle it after use, being it possible to use, in whole or in part, recycled polyethylene terephthalate as raw material for a subsequent life cycle of the plastic material.

Nowadays, the strongly felt need is therefore to use, as raw material of the extrusion process, plastic material in whole or in part recycled, in particular polyethylene terephthalate, which comes in the form of flakes obtained by shredding and cutting recycled products such as bottles, jars, trays and the like.

The use of recycled polyethylene terephthalate, as raw material with which to supply an extrusion line, however, involves some problems, first of all those due an excessive degree of humidity of the origin raw material and the presence of undesirable contaminants in the recycled raw material coming from the previous life cycle of the plastic material or from the recycling process itself.

In this regard, it should be noted that the presence of an excessive degree of humidity during the extrusion phase of the plastic material determines the difficulty in obtaining a workable product with the extrusion phase, without prior dehumidification of the raw material to be used.

This dehumidification can be obtained by keeping the raw material to be dehumidified in a ventilated silo for a few hours and at a temperature of 160° C.

Alternatively, in accordance with the EP 1 703 239 B1 patent, in the name of SMC Technology Sri and whose inventor is Mr. Pagotto Amedeo, it has been proposed to use an apparatus where the material to be dehumidified is advanced slowly in countercurrent with respect to a flow of dehumidified air, also being provided microwave generators for acting on the material to be processed inside the aforesaid heater.

Further, in accordance with the EP 1 226 922 B2 patent, the preventive dehumidification phase of the recycled plastic material can be avoided, thanks to the specifically designed degassing areas of the material in the molten state.

However, the problem of being able to purify the recycled plastic material from contaminants including, from the literature, there are volatile and non-volatile substances, polar and non-polar substances, remains. This purification is necessary to make the products obtained from the extrusion process suitable for contact with food.

SUMMARY OF THE INVENTION

The problem underlying this invention is that of devising an apparatus and a process for the purification of recycled plastic material, in particular, polyethylene terephthalate, coming from recycling, which have structural and/or functional characteristics such as to meet the aforesaid requirement, thus obviating at the same time the drawbacks above with reference to the prior art.

This problem is solved by an apparatus for the purification of plastic material according to the claims, as well as by an extrusion system for plastic material, in particular, polyethylene terephthalate, according to the claims.

According to a further embodiment, this problem is solved by a process for the purification of plastic material intended for contact with food, in particular, polyethylene terephthalate, according to the claims, as well as by an extrusion process of such purified plastic material in accordance with the claims.

The advantages:
  of the apparatus according to the invention for the purification of plastic material intended for contact with food, as well as:
  of the extrusion system for plastic material according to the invention,
  of the process according to the invention for the purification of plastic material and
  of the extrusion process according to the invention, will result from the following description of some of its preferred embodiments, given by way of non-limiting example, with reference to the attached figures.

BRIEF DESCRIPTION OF THE DRAWINGS

In the attached drawings
FIG. 4 shows an enlarged section of an upper part of the extruder in FIG. 2 and
FIGS. 5, 6 and 7 are enlarged views of details of sections of the extruder of FIG. 4.

DETAILED DESCRIPTION OF THE PREFERRED EMBODIMENTS

With reference to the enclosed figures, the reference 1 indicates as a whole a system according to the invention for the extrusion of plastic material, in particular for the extrusion of polyethylene terephthalate.

Figure 1:
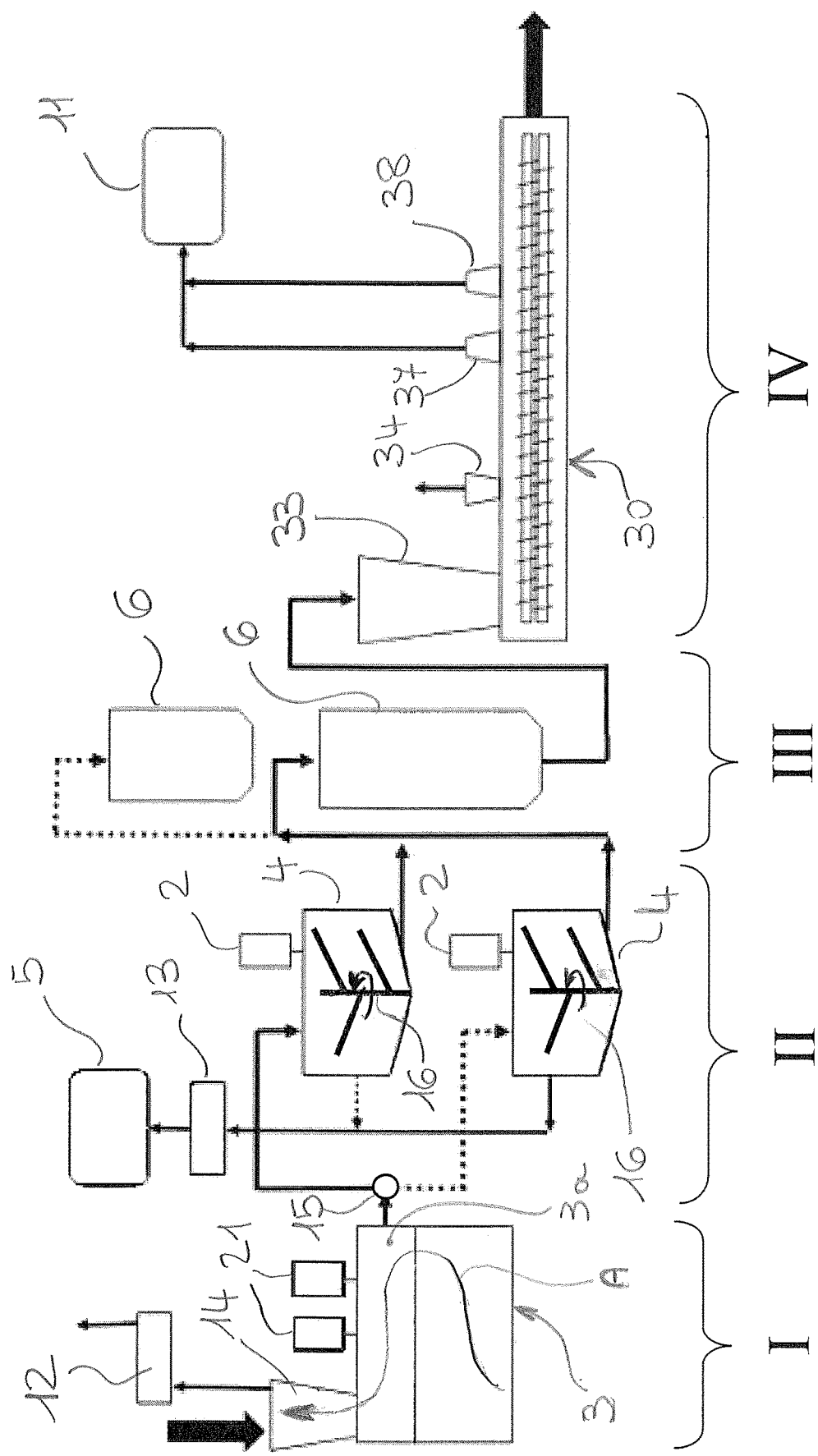
FIG. 1 is a simplified schematic view of an extrusion system made of plastic material according to the invention comprising an apparatus for purifying plastic material intended for contact with food according to the invention and a plastic material extruder.
Figure 3:
FIG. 3 shows a schematic cross-section of the two screws of the twin-screw extruder in FIG. 2.
Figure 2:
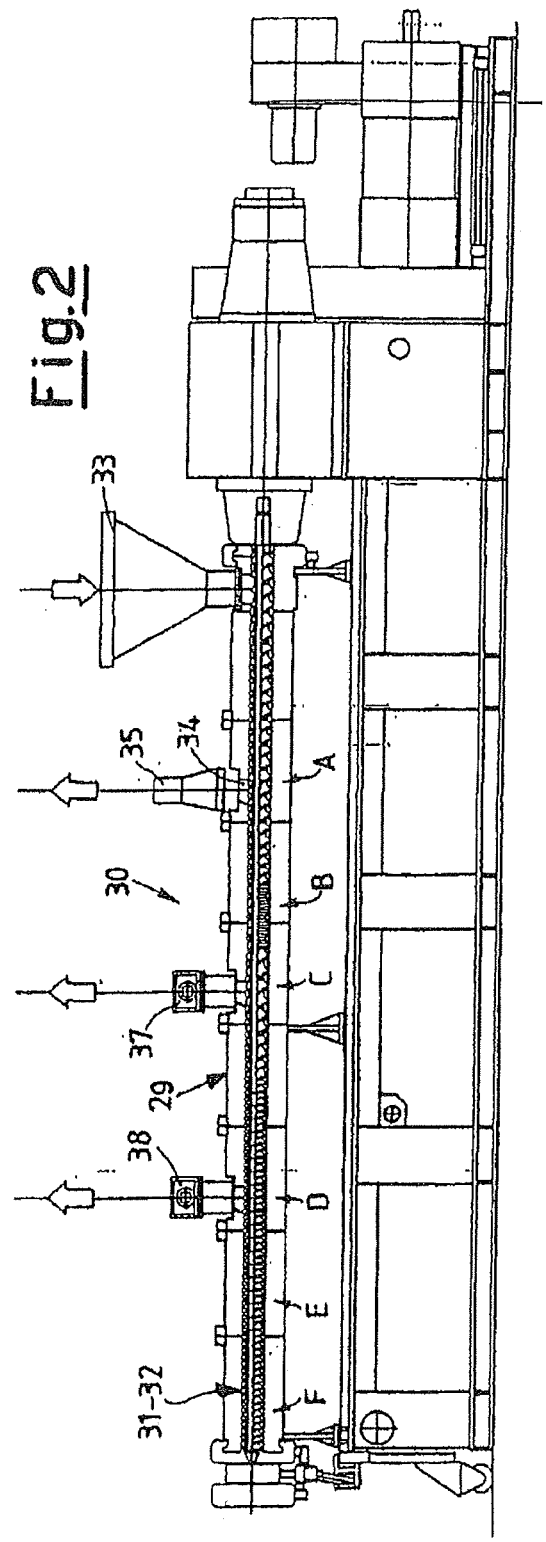
FIG. 2 shows a raised view of a corotating twin-screw extruder of the extrusion system in FIG. 1.

According to the embodiment shown in the diagram of FIG. 1, the plastic extrusion system 1 comprises the following stages arranged in series:
- a first stage I comprising supply means 14 of plastic material, in whole or in part recycled, and heating means for carrying out a purification pre-treatment of said plastic material, which generally comes in the form of flakes when recycled;
- a second stage II for the purification of the plastic material from contaminants;
- a possible (it is only optional) third stage III of accumulation of the plastic material treated in stage II;
- a fourth stage IV of extrusion comprising a twin-screw extruder 30 supplied with the plastic material treated in stage II.

The aforesaid first stage I comprises a heater 3 identified by a closed container through which the plastic material, in whole or in part recycled, generally in flakes, preferably polyethylene terephthalate, is allowed flowing between an inlet and an outlet.

The inlet opening of the flake material of the heater 3 interacts with the aforesaid supply means 14; the example shows a loading hopper intended to contain a preset amount of plastic material.

Inside the heater 3 there are progress means intended to ensure the advancement of the flakes of plastic material in a treatment chamber 3a between an inlet end and an outlet end of the heater 3 in a time equal to the time of the expected process, for example, a period of about 60 minutes.

Preferably, the aforesaid progress means are positioned in the aforesaid chamber 3a and comprise a shaft with a horizontal rotation axis provided with blades, not shown, whose rotation ensures the aforementioned progress of the flakes of plastic material between the heater inlet end and output end 3.

It should be pointed out that the heater 3 is driven by a heated air flow (characterized by A in FIG. 1) that flows into the heater 3 in countercurrent with respect to the progress direction of the plastic material.

The aforementioned heated air flow A generates a triple effect on the plastic material processed in the heater 3:
- reduction of the degree of humidity (drying) of the plastic material;
- first purification from very volatile contaminants;
- heating of the plastic material.

Regarding the heating of the plastic material inside the container of the heater 3, it is useful to highlight that this heater as well as the flow rate and temperature of the hot air are such as to determine a temperature of the plastic material at the outlet of the container of the heater 3 minor or equal to 185° C. and in any case not less than 150° C., preferably not less than 160° C., more preferably a temperature that is close to and not less than 170° C.

The aforesaid range of temperature values is such as to ensure the aforementioned triple effect on the plastic material processed in the heater 3, without however causing undesired degradation in the plastic material itself.

Preferably, the aforesaid heater 3 inside which the pre-treatment of the plastic material takes place is also provided with irradiating heating means 21, which contribute to heating the plastic material passing through the heater 3 until it is brought to the temperature values above specified at the outlet of the heater container 3 and promote the excitation of the polar molecules.

Preferably, the aforementioned irradiating heating means 21 comprise, more preferably consist of, one or more microwave heating device, essentially microwave generators.

Preferably, the aforementioned flow of heated air expelled from the inlet opening of the plastic material of the heater 3 is processed through a system for filtering and decanting the exhausted air, preferably after said air flow is also passed through the aforesaid loading hopper.

Now taking into account the aforesaid second stage II for the purification of the flakes of plastic material from contaminating agents, it is evident that it comprises at least a reactor 4.

In accordance with the embodiment shown in FIG. 1, the second stage II of the extrusion system 1 comprises two reactors 4 acting in parallel with each other, each reactor 4 having a capacity suitable to contain an amount of plastic material at least equal to 50%, preferably between 50% and 65% of the hourly production of the plastic material processed in the heater 3. This advantageously allows the plastic material to be processed in the heater 3 in continuous mode, so as to avoid inhomogeneous stationing during heating, and operate in the reactors 4 in discontinuous mode.

Obviously, the same result, i.e. continuous first stage I and discontinuous second stage II, can also be obtained by providing a larger number of smaller reactors having as a whole at least a capacity equal, preferably a little higher than, to the production capacity of the heater 3 of the first stage I, even if this involves an increase in the installation costs.

The outlet of the container of the heater 3 is connected to the inlet of the containers 4 by interposing a rotary valve 15, that is a drain valve capable of passing the hot material from the outlet of the container of the heater 3 to the inlet of one of the two reactors 4 in a controlled manner.

Each reactor 4 comprises heating means, for example electrical heaters or a gap covered by heated liquids, associated with its outer walls, i.e. the reactor jacket, and an insulating outer layer to reduce the heat exchange between the inside of the reactor and the external environment.

In essence, the aforesaid heating means associated with the walls of the reactor 4 and the aforementioned insulating layer have the function of maintaining as far as possible the temperature of the plastic material previously heated in the aforementioned first stage I, thus avoiding that the temperature of the plastic material may decrease during its period of stay in the reactor 4.

Given the dimensioning of the system 1 considered above, that is with two separate reactors 4, the process time employed by each reactor 4 to carry out the necessary treatment step in discontinuous mode of the loaded plastic material is substantially equal to at least 30 minutes. In order to perform the plastic material treatment process, the system 1 comprises a vacuum pump 5 connected by suction to an opening of the reactor 4, with the interposition of a filter 13, so as to ensure inside the reactor 4 a preset vacuum value to be maintained substantially in the purification process step in the reactor 4.

In particular, the process of treatment of the heated plastic material inside the reactor 4 preferably occurs at a pressure of less than or equal to 5 millibars, more preferably at a pressure of less than 5 millibars, obviously excluding the transitory phases provided for at the beginning and at the end of the process cycle.

Preferably the purification in the reactor 4 takes place while the reactor 4 is at a temperature lower than or equal to 185° C. and in any case not lower than 150° C., preferably not less than 160° C., more preferably a temperature that is close to and not less than 170° C. In fact, it has been found that higher temperatures can cause undesirable degradation of the plastic material, while lower temperatures require excessively long processing times of the material to the detriment of the productivity of the process underway.

Advantageously, the reactor 4 also comprises irradiating heating means 2 for supplying energy to the plastic material contained inside the reactor 4 and for promoting the excitation of the polar molecules.

In this regard, the following factors are highlighted:
vacuum presence,
very low thermal conductivity of the plastic material to be processed and
flake conformation of at least a part of the plastic material to be processed, make very little the amount of thermal energy that can be transferred from the walls of the reactor 4 to the plastic material contained therein, so that the electric heaters mentioned above actually have the purpose of replenishing the heat energy dispersed by the reactor 4 towards the surrounding environment, despite the above insulation, rather than being able to effectively heat the plastic material contained inside the reactor 4.

The irradiating heating means 2 of the reactor 4 are instead able to supply energy to the plastic material contained inside the reactor 4, further integrating, or at least maintaining optimally, the temperature that the plastic material has reached in the heater 3 of the first stage I.

Given this, a preferred embodiment of the invention provides for the presence of the heater 3 upstream of the stage II.

Preferably, the aforementioned irradiating heating means 2 of the reactor 4 comprise, more preferably, consist of one or more microwave heating devices to promote the excitation of the polar molecules so as to reach the vapor pressure of the contaminants in a simpler manner, which results in the removal from the plastic material due to the suction carried out by the vacuum pump 5.

Each reactor 4 is therefore equipped with:
an input of the preheated material to be purified interacting with the outlet from the container of the heater 3 by means of the rotocell 15;
an outlet of the purified material to supply such purified material to the extrusion line, optionally with interposition of a buffer of accumulation of the purified material;
an output connected to the vacuum pump 5;
an inlet connected to a blower to allow the unloading of material by means of entertainment by an air flow produced by the aforesaid blower inside the reactor 4;
valve means applied to the aforesaid openings during sealing or opening of material and/or air.

Preferably, the reactor 4 comprises an internal stirrer 16, for example a rotating stirrer, to ensure the stirring of the material inside the reactor 4, so as to ensure a homogeneous exposure of all the solid plastic material contained within the exposure of the irradiation means 2 and to the inner walls of the reactor itself.

According to the embodiment of FIG. 1, the extrusion system 1 also comprises one or more accumulation buffer 6 of the purified material coming from the reactors 4 that, as a whole, identify the aforesaid third stage III.

The buffers 6 are designed to supply the twin-screw extruder 30 of the fourth stage IV, more specifically to supply the loading hopper 33 of the latter.

As highlighted above, it is possible to eliminate the presence of buffers 6. In this case the reactors 4 provide to unload the purified material directly into the loading hopper 33 that supplies the extruder 30.

The fourth stage IV of the extrusion system 1 therefore comprises the twin-screw extruder 30 equipped with a loading hopper 33.

The extruder 30 comprises a casing 29 inside which two screws 31 and 32 are arranged, co-rotating in the same direction of rotation.

The plastic material already processed by a reactor 4 is treated between the two screws 31 and 32 advancing inside the extruder 30 that is, for example, thermo-regulated with oil In correspondence with a first area A positioned after a first portion of the extruder 30 starting from the loading hopper 33, in the body of the extruder 30 an opening 34 is created at which a suction hood 35 can optionally be placed, performing a degassing called "open air" or degassing in the environment.

The aforementioned suction hood 35 provides for a slight depression, so that the plastic material still in the solid state, for example in the form of flakes and the like, is not drawn in and removed from the extruder 30 itself. It is in fact necessary to consider that the plastic material in this area of the extruder 30 only partly fills the channels of the screws 31 and 32 and any excessive depression could remove a part of this plastic material.

Further progressing within the extruder 30, in a subsequent second zone B, an arrangement of parts that acts as a plug is identified. This area can be identified in the presence of a series of cams 36, located on the screws 31, 32, which are loaded with an almost molten material and under slight pressure. Such a prediction makes it possible not to influence the degassing in the previous environment with the strong depression of the subsequent degassing group, as better explained below.

In fact, in a subsequent zone C, a first degassing 37 with a vacuum pump 11 is provided, or alternatively with a suction chimney, followed at a short distance, in a further area D by a second degassing 38 with a vacuum pump 11, or alternatively with a suction chimney. The above degassing 37 and 38 identifies a tandem degassing that, for example, in an extruder with a length ratio of thirty-four and forty-two diameters, provides a distance between the two chimneys around 6-9 diameters.

Internally, each screw 31 and 32 is manufactured to be filled only partially from the molten material and to expose a surface of material greater than the vacuum suction action. In this way, the whole mass is subjected to the same treatment efficiently thanks to the vacuum created.

This degassing has a definitive action for the removal of any residual humidity and for the removal of the contaminants still present after the treatment step carried out in a reactor 4 of the aforesaid second stage II.

The extruder 30 then continues into a further zone E in which transport and dosing are carried out by the screws 31 and 32 thereof.

Finally, in the extruder 30 there is a final zone F in which the final pumping of the material produced by such a procedure is carried out.

It should be pointed out that the aforesaid second stage II of the extrusion system 1 is able to achieve a purification with a high capacity of the plastic material, particularly in the case where the plastic material processed in a reactor 4 has not only been previously heated at the temperature of the previously specified procedure, but has also been subjected to the process step carried out in the first stage I with ventilation with a countercurrent flow of heated air and above all heating by irradiation means, in particular microwave generators.

The aforementioned purification system has a very high capacity to purify the plastic material treated from contaminants.

Differently, the structure of the extruder 30 comprising an open-ended degassing 34 in the section in which the plastic material is still in a solid state and two successive degassings 37 and 38 with a vacuum pump 11, when the material is in a fluid state, has a processing capacity lower than the second stage II of the system 1 but has a very high resolution in eliminating the contaminants, thus allowing to obtain a very strong purification of the treated plastic material.

As can be appreciated from what has been described, the apparatus for the purification of plastic material according to the invention, as well as the plastic extrusion system according to the invention, the process for the purification of plastic material by extrusion according to the invention and the extrusion process according to the invention allow meeting the aforesaid requirement and overcoming at the same time the drawbacks referred to in the introductory part of this description with reference to the prior art.

The combination in series of the two systems such as the plastic material treatment system and the extrusion with the extruder described above allows obtaining a very high level of purification, certainly able to meet the requirements of the FDA and EFSA standards currently in force.

It is therefore a preferred embodiment to provide that the purification process described above foresees both phases: treatment of purification of the plastic material in the reactors and subsequent extrusion phase with the specific extruder 30 described above.

Obviously, a person skilled in the art, in order to meet contingent and specific needs, may make numerous amendments and changes to what has been described above, all however contained within the scope of protection of the invention as defined by the following claims.

The invention claimed is:

1. An apparatus for purification of plastic material intended for food contact from contaminants comprising at least one reactor for receiving the plastic material to be purified, the at least one reactor comprising:
   a closed housing having an opening for the plastic material to be loaded into the housing and an opening for the plastic material to be unloaded therefrom;
   a vent relief;
   respective valve means associated with the openings for loading and unloading the plastic material and closing and opening of the openings;
   a vacuum pump connected in fluid communication with the vent relief with an interposition of further valve means;
   stirring means located in the housing for ensuring that the plastic material is stirred in the reactor during the process, and
   heating means associated with the reactor,
   wherein the heating means comprise radiant heating means for supplying energy to the plastic material contained in the reactor,
   wherein the at least one reactor is fed with the plastic material to be purified from a heater located upstream from the reactor, wherein the heater comprises:
   a housing comprising feeding means with a shaft having a horizontal axis of rotation with blades for feeding the plastic material between an inlet and an outlet;
   ventilation means for blowing a flow of heated air (A) in the housing of the heater, countercurrent to a direction of feed of the plastic material in the heater, and radiant heating means supplying energy to the plastic material contained in the heater, the radiant heating means of the heater comprising at least one microwave radiant heating device for promoting excitation of polar molecules.

2. The apparatus according to claim 1, wherein the radiant heating means comprise at least one microwave radiant heating device for promoting excitation of polar molecules.

3. The apparatus according to claim 1, wherein the heating means comprise heating means associated with walls of the at least one reactor, and comprise electrical resistors and/or a cavity with heated liquids flowing therein.

4. The apparatus according to claim 1, the reactor comprising a heat insulating layer for reducing heat exchange between an interior of the reactor and an outside environment.

5. The apparatus according to claim 1, wherein the apparatus further comprises at least one buffer for purified plastic material that exits from the reactor.

6. The apparatus according to claim 1, wherein the plastic material is polyethylene terephthalate.

7. A plastic extrusion plant for extrusion of plastic material, the plastic extrusion plant comprising an extruder for extruding the plastic material,
   wherein the extruder is located downstream from the apparatus for purification of the plastic material from contaminants according to claim 3.

8. A plastic extrusion plant for extrusion of plastic material, the plastic extrusion plant comprising an extruder for extruding the plastic material,
   wherein the extruder is located downstream from the apparatus for purification of the plastic material from contaminants according to claim 1.

9. A plastic extrusion plant for extrusion of plastic material intended for food contact, the plastic extrusion plant comprising an apparatus for purification of the plastic material from contaminants, and an extruder for extruding the plastic material,
   the apparatus for purification of the plastic material comprising at least one reactor for receiving the plastic material to be purified, the at least one reactor comprising:
   a closed housing having an opening for the plastic material to be loaded into the housing and an opening for the plastic material to be unloaded therefrom;
   a vent relief;
   respective valve means associated with the openings for loading and unloading the plastic material and closing and opening of the openings;
   a vacuum pump connected in fluid communication with the vent relief with an interposition of further valve means;
   stirring means located in the housing for ensuring that the plastic material is stirred in the reactor during the process, and
   heating means associated with the reactor, the heating means comprise radiant heating means for supplying energy to the plastic material contained in the reactor, and comprise heating means associated with walls of the at least one reactor, and comprise electrical resistors and/or a cavity with heated liquids flowing therein,
   the extruder for extruding the plastic material is located downstream from the apparatus for purification of the plastic material from contaminants, wherein the extruder comprises a chassis, containing a twin-screw extruder, the extruder having an inlet for the plastic material to be extruded and comprises a plurality of venting zones with vent ports, a sealing zone and a conveying and metering zone actuated by the screws, wherein:
- the two screws of the extruder are co-rotating so as to have a same direction of rotation,
- a first venting zone is provided for venting to atmosphere, and the first venting zone for venting to the atmosphere is equipped with an extraction hood,
- a second venting zone is provided, which comprises a first vent with a vacuum pump and a second vent with a vacuum pump in tandem,
- a sealing zone is provided between the first and second venting zones, which is made up of a series of cams located on the screws, which are loaded with a quasi-molten material under light pressure to prevent deterioration of the material being processed.

10. A plastic extrusion plant for extrusion of plastic material intended for food contact the plastic extrusion plant comprising a heater, an apparatus for purification of the plastic material from contaminants, and an extruder for extruding the plastic material,
the heater comprises:
- a housing comprising feeding means with a shaft having a horizontal axis of rotation with blades for feeding the plastic material between an inlet and an outlet;
- ventilation means for blowing a flow of heated air (A) in the housing of the heater, countercurrent to a direction of feed of the plastic material in the heater, and radiant heating means supplying energy to the plastic material contained in the heater, the radiant heating means of the heater comprising at least one microwave radiant heating device for promoting excitation of polar molecules the apparatus for purification of the plastic material comprising at least one reactor for receiving the plastic material to be purified, the at least one reactor comprising:
- a closed housing having an opening for the plastic material to be loaded into the housing and an opening for the plastic material to be unloaded therefrom;
- a vent relief;
- respective valve means associated with the openings for loading and unloading the plastic material and closing and opening of the openings;
- a vacuum pump connected in fluid communication with the vent relief with an interposition of further valve means;
- stirring means located in the housing for ensuring that the plastic material is stirred in the reactor during the process, and
- heating means associated with the reactor, wherein the heating means comprise radiant heating means for supplying energy to the plastic material contained in the reactor, the at least one reactor is fed with the plastic material to be purified from the heater located upstream from the reactor,
the extruder is located downstream from the apparatus for purification of the plastic material from contaminants, wherein the extruder comprises a chassis, containing a twin-screw extruder, the extruder having an inlet for the plastic material to be extruded and comprises a plurality of venting zones with vent ports, a sealing zone and a conveying and metering zone actuated by the screws, wherein:
- the two screws of the extruder are co-rotating so as to have a same direction of rotation,
- a first venting zone is provided for venting to atmosphere, and the first venting zone for venting to the atmosphere is equipped with an extraction hood,
- a second venting zone is provided, which comprises a first vent with a vacuum pump and a second vent with a vacuum pump in tandem,
- a sealing zone is provided between the first and second venting zones, which is made up of a series of cams located on the screws, which are loaded with a quasi-molten material under light pressure to prevent deterioration of the material being processed.

11. The apparatus according to claim 9, wherein the plastic material is polyethylene terephthalate.

12. The apparatus according to claim 10, wherein the plastic material is polyethylene terephthalate.

* * * * *